UNITED STATES PATENT OFFICE.

CLARENCE R. ROBINSON, OF BROOKLYN, NEW YORK, ASSIGNOR TO PERKINS GLUE COMPANY, A CORPORATION OF PENNSYLVANIA.

ADHESIVE.

1,267,699.  Specification of Letters Patent.  Patented May 28, 1918.

No Drawing.  Application filed March 13, 1916.  Serial No. 83,831.

*To all whom it may concern:*

Be it known that I, CLARENCE R. ROBINSON, a citizen of the United States, and resident of Brooklyn, Kings county, State of New York, have invented certain new and useful Improvements Relating to Adhesives, of which the following is a specification.

The invention relates to improvements in adhesives or coatings, and more particularly to adhesive coatings or glazing material for paper or the like. The main object of the invention is to provide a material of the class described, which not only is satisfactory in its adhesive and coating qualities, but which may be very cheaply and economically made, so that a considerable saving in cost is attained. Further objects, features and advantages will more clearly appear from the detailed description given below.

While my improvements may be carried out in various ways and by various formulæ, I will describe a preferred method of carrying out my invention, for preparing a paper coating adhesive material.

I take 100 parts of dry starch, preferably cassava starch (that known as K T H brand may be used) and mix with this 1/2 to 3 parts, preferably about 1 part of finely powdered bisulfate of soda, the starch being in the dry form. The K T H brand cassava above mentioned is a fairly good quality or medium grade of cassava flour containing a moderate amount of meal and is made in and imported from Java. I also mix in with the dry starch from 4 to 8 parts of dry powdered causic soda, preferably about 6 parts of caustic soda, all of the materials being in the dry form except for such hygroscopic or combined moisture as they may contain. These are thoroughly mixed together by hand tools or suitable machinery, and the chemicals act upon the starch to partially modify the same, or partially solubilize it. After this thorough mixing I add from 1/2 to 3 parts, preferably 1 part, of tri-sodium-phosphate, and also spray on to the batch and mix therewith a sufficient amount of ammonia solution, to very slightly dampen the mixture. These materials thoroughly mixed may be shipped in dry form to the consumer, who may carry out the second step of the process, to make the fluid adhesive coating. Or the adhesive coating may be made up at once in fluid form and shipped in fluid form. In either case I prefer to make the fluid coating from the above mentioned base as follows. To the starch mixture I add from 4 to 8 parts of water, preferably about 6 parts, and cook the mixture until the starch is substantially solubilized. During the cooking, the bisulfate neutralizes the caustic to a certain extent, forming sodium sulfate, but an excess of causic soda still remains to act upon the starch. Tri-sodium phosphate and some of the ammonia will also remain, and these may also have some action on the starch. The cooking should consist of active boiling in live steam for from five to twenty minutes, preferably about twelve minutes, depending upon the amount of the free caustic soda in the solution and on the kind and grade of starch used, until the batch, while hot, flows from a stick almost as freely as milk, and becomes clear and transparent. After the starch is sufficiently solubilized, the batch is very nearly neutralized with acetic acid or muriatic acid, leaving it very slightly alkaline to litmus, and from 1/10 to 3 parts, preferably in the neighborhood of 1 part of cupra-ammonium-sulfate is added.

In order to give the adhesive coating greater body, casein, animal glue, or other suitable material may be added. For instance, for a certain grade and weight of coating, the addition of 100 parts of casein is found to be suitable.

The bisulfate of soda and caustic soda act to modify or degenerate and more or less solubilize the starch. The tri-sodium-phosfate, I believe, is substantially without action on the starch, except perhaps to change the molecular arrangement of the starch and unite with the starch in some way, but I believe it acts to a material extent to promote the amalgamation of the starch with the casein or the like. The ammonia, I believe, has to some extent, a similar action. The cupra-ammonium-sulfate is added to "waterproof" the starch. That is, to render the starch less water absorptive, so that when paper to which the coating is applied and dried, is wet, the coating is more or less water repellent and has substantially the desired waterproofing qualities of well-known paper coatings.

When the starch adhesive is used with animal glue instead of casein, I find it desirable to put in the glue before neutralizing; that is, to mix the animal glue in dry, with the dry mixture of starch, bisulfate and caustic, so that the animal glue is subjected to the cooking action, which, I believe, prevents the glue from "jellying".

Other suitable materials may be used for modifying or solubilizing to the desired extent the starch in the broader aspects of the invention and a great many of such agents are well-known to those skilled in the art. Also other agents and materials may be used for promoting amalgamation of the starch with the casein or other adhesive with which the starch adhesive is mixed, and also other materials may be used for producing the desired waterproofing effect in the resultant dried coating. Consequently, the invention in its broader aspects is not limited to the details described and I desire to cover all formulæ coming within the language of the appended claims.

What I claim as new and desire to secure by Letters Patent is:

1. The process of making adhesives or coatings, which consists in treating starch in dry form with bisulfate of soda, and caustic soda, mixing therewith tri-sodium phosphate, adding water thereto and cooking the batch until the starch is substantially solubilized, then neutralizing the batch and adding cupra ammonium sulfate.

2. The process of making adhesives or coatings, which consists in treating starch in dry form with bisulfate of soda, and caustic soda, mixing therewith tri-sodium phosphate, adding water thereto and cooking the batch until the starch is substantially solubilized, then neutralizing the batch and adding cupra-ammonium sulfate and casein.

3. The process of making adhesives or coatings which consists in treating starch in the dry form with a modifying agent to partially modify the starch, and then mixing the same with water and cooking the mixture, a suitable waterproofing medium being added.

4. The process of making adhesives or coatings, which consists in treating starch in the dry form with an alkaline modifying agent to partially modify the starch, and then mixing the same with water and cooking the mixture, and then neutralizing the batch, a suitable waterproofing medium being added.

5. The process of making adhesives or coatings, which consists in treating about 100 parts of dry cassava starch with about 1 part bisulfate of soda, and about 6 parts caustic soda, to modify the starch, mixing therewith about 1 part of tri-sodium phosphate and about 6 parts of water, and some ammonia, cooking the mixture until the starch is substantially solubilized, then neutralizing the batch and adding about 1 part of cupra ammonium sulfate.

6. The process of making adhesives or coatings, which consists in treating starch in the dry form with a modifying agent to partially modify the starch, and then mixing the same with water and cooking the mixture, casein being added thereto and the batch containing tri-sodium phosphate to promote the amalgamation of the starch with the casein.

7. The improved adhesive or coating comprising substantially solubilized starch in water, casein, and a material to promote the amalgamation of the starch with the casein.

8. The improved adhesive or coating comprising substantially solubilized starch in water, casein, and a material to increase the waterproof character of the dried adhesive or coating.

9. The improved adhesive or coating having in combination substantially solubilized starch and water and a material to increase the waterproof character of the dried adhesive or coating.

10. The improved adhesive or coating containing starch and water and cupra ammonium sulfate to increase the waterproof character of the dried adhesive or coating.

11. The improved adhesive or coating containing an animal adhesive, such as hide glue or casein, starch and water and a material to promote the amalgamation of the starch and animal adhesive.

12. The improved adhesive or coating comprising substantially solubilized starch in water, casein, and a material to promote the amalgamation of the starch with the casein, and a material to increase the waterproof character of the dried adhesive or coating.

In testimony whereof, I have signed my name to this specification.

CLARENCE R. ROBINSON.